US008667301B2

(12) United States Patent
Farrugia et al.

(10) Patent No.: US 8,667,301 B2
(45) Date of Patent: Mar. 4, 2014

(54) OBFUSCATING TRANSFORMATIONS ON DATA ARRAY CONTENT AND ADDRESSES

(75) Inventors: Augustin J. Farrugia, Cupertino, CA (US); Mathieu Ciet, Paris (FR); Benoit Chevallier-Mames, Paris (FR)

(73) Assignee: Apple Inc., Cupertino, CA (US)

( * ) Notice: Subject to any disclaimer, the term of this patent is extended or adjusted under 35 U.S.C. 154(b) by 799 days.

(21) Appl. No.: 12/753,021

(22) Filed: Apr. 1, 2010

(65) Prior Publication Data

US 2011/0246787 A1    Oct. 6, 2011

(51) Int. Cl.
    *G06F 12/14*    (2006.01)
(52) U.S. Cl.
    USPC .............................. 713/189; 717/110; 380/277
(58) Field of Classification Search
    USPC ......................................................... 713/190
    See application file for complete search history.

(56) References Cited

U.S. PATENT DOCUMENTS

| 8,209,549 B1* | 6/2012 | Bain, III ........................ 713/193 |
| 2005/0002532 A1* | 1/2005 | Zhou et al. ..................... 380/277 |
| 2007/0244951 A1* | 10/2007 | Gressel et al. ................ 708/252 |
| 2009/0113217 A1* | 4/2009 | Dolgunov et al. ............. 713/190 |
| 2009/0307657 A1 | 12/2009 | Farrugia et al. |
| 2010/0287374 A1* | 11/2010 | Roy et al. ....................... 713/171 |
| 2011/0314300 A1* | 12/2011 | Taskaya et al. ................ 713/189 |

OTHER PUBLICATIONS

Zhu, William, et al., "Obfuscate Arrays by Homomorphic Functions," Month unknown, 2006, pp. 770-773, 2006 IEEE, Auckland, New Zealand.

* cited by examiner

*Primary Examiner* — Ashok Patel
*Assistant Examiner* — Andrew Goldberg
(74) *Attorney, Agent, or Firm* — Adeli & Tollen LLP (57) ABSTRACT

In a first computer (digital) data obfuscation process, data which is conventionally arranged in a data structure called an array (e.g., a table) and conventionally stored in computer or computer device memory is obfuscated (masked) by logically or mathematically combining the data, entry-by-entry, with a masking value which is computed as a logical or mathematical function of the entry itself or its index in the array, modulo a security value. The complementary unmasking value is a pointer to the entry's address in the table modulo the security value. In a second computer (digital) data obfuscation process, the addresses (location designations) in memory of a data array are themselves obfuscated (masked) by partitioning the array into blocks of entries and shuffling the order of the data entries in each block by a predetermined algorithm, resulting in a shuffled array also differing from the original array in terms of its size (the total number of entries).

18 Claims, 4 Drawing Sheets

OBFUSCATING TRANSFORMATIONS ON DATA ARRAY CONTENT AND ADDRESSES

FIELD OF THE INVENTION

This disclosure relates to computer security and data storage and more specifically to preserving security of computer (i.e., digital) data using obfuscation.

BACKGROUND

In the field of computer software, security is important. Well known technical measures for protecting the security of software and computer data include what is referred to in the field as "software obfuscation" or "code obfuscation" which protect software from unauthorized use or access by making the software code more obscure than it is in its original form, thus making it harder for a potential attacker to understand it or access it or its contents during execution. In general obfuscation is intended to make it more time consuming to reverse engineer a program, typically to protect the program against hackers or attackers who wish to determine what the software is doing or to alter it. One aspect of software is handling of data and hence obfuscating data is also important.

It is known to obfuscate arrays of data (also referred to as data structures in the field) which are being manipulated by computer software, see "Obfuscate Arrays by Homomorphic Functions" by William Zhu et al., IEEE, 2006, which discloses several methods of software obfuscation using data transformation. The data transformations described there include array index changes, array folding and array flattening. Array folding consists of increasing the dimension of an array in the software code, such as transforming a two dimensional array into one dimensional array. Array flattening decreases the dimensions of an array. It is known to accomplish this through homomorphic obfuscations to obfuscate programs and data through changing the index so the dimension of array in the programs.

New methods of obfuscation are of great interest in the software field and especially methods of obfuscating or protecting data which is being processed in a non-secure environment such as a consumer electronics device or personal computer. This especially occurs in the context of content protection software, which protects digital content such as audio and video material from misuse. Typically at least a portion of this content protection software is executed in a client device such as a mobile telephone, laptop computer, video player, etc. where the device itself is accessible to hackers, as are some of its internal operations.

Computer software is first written as source code which is readable by a person trained to understand programming languages. Generally that source code is then compiled to object code that contains a list of instructions controlling what a computer or computing device does. Generally obfuscation techniques, especially when applied to object code, are independent of the actual source code language used. This is because all source code when compiled results in a binary string of values. Hence obfuscation as described here is applicable to code in all known computer languages.

Hence it is conventional that the obfuscation process is performed at one location or in one computer (machine) after the source code has been written and when it is compiled. The obfuscated code is then transferred to a second computer/processor where it is to be executed after installation in associated memory at the second computer. (Note that the normal execution does not include any "decompiling" since there is no need on a machine-level basis to restore the source code. Decompiling is strictly done for reverse engineering purposes.) At the second (recipient) computer, the obfuscated code is installed and then can be routinely executed by the processor at the second computer. The obfuscated code is executed as is. The obfuscated code may be slower to execute than the original code.

In computer programming, an array is a data structure holding a group of data elements accessible through an index. An array may be fixed-size or static, meaning the array size is set at the creation of the array and cannot expand or shrink thereafter, or an array may be dynamic, meaning that the size of the array can be changed. Typically, an array contains a group of like data elements, or at least data elements of the same size. In the ANSI "C" computer programming language, if for example a programmer has need for 10 integers, a fixed-size array named NUMBERS can be created to hold all 10; a sample line of C language source code to create such an array of integers is "int NUMBERS[10];". Each individual data element in the array is accessible via an index when the array is called; sample code to access the first data element is NUMBERS [0], the second data element is NUMBERS[1], the third data element is NUMBERS[2], etc. In the popular C (and C++) programming languages, as well as many other languages, array elements are accessed starting at the index number zero. In most programming languages, arrays are stored in a computer in contiguous logical memory location. For example, assume storing an integer requires 32 bits of memory. A ten element array of integers requires 10*32 or 320 bits. Because the array is stored contiguously in one large block, when the second data element NUMBERS[1] is requested, the computer starts at the (logical) memory address of NUMBERS[0] and offsets or skips forward 32 bits to start reading the memory storing the second data element. For the third data element, the computer skips forward another 32 bits and so on.

The NUMBERS example above is a single dimensional array (also called a table). Multidimensional arrays also exist and are structured and behave in a similar way. A sample line of code to create a two dimensional array of integers is "int NUMBERS2D[10][10];". A two dimensional array is conceptually an array of arrays. Three and higher dimensional arrays exist and are commonly used in programming. The principles described herein may be applied to multidimensional and single dimensional arrays.

Figure 1:
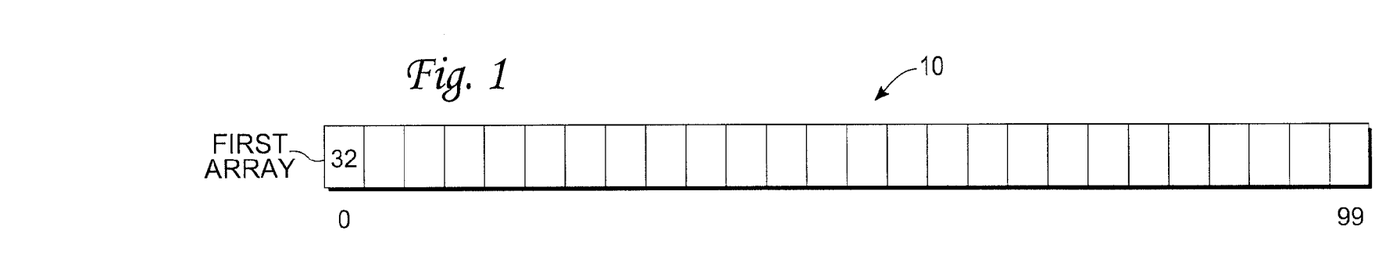
FIG. 1 shows a data array in the prior art.

FIG. 1 illustrates such an array (table) 10. Array 10 is a fixed-size array containing one hundred 32-bit data elements indexed from 0 to 99. Array 10 as explained above may store any type of information which may be represented digitally and any size of data element, limited only by the computer hardware it is represented in. Passwords, social security numbers, user names, bank account numbers, and the like are all examples of information which may be stored in such an array.

SUMMARY

In the field of obfuscation, the present methods are intended respectively to obfuscate (1) content and (2) addresses of data arrays (including tables) which are conventionally stored in memory. In the first method to obfuscate data, one chooses a type of mask such as affine, exclusive OR, or additive. Then one chooses a function and masks the data in the array (entry-by-entry) by mathematically or logically combining (using the function) a mask value which is the function of the array address modulo a security parameter with one entry of the array data itself. Alternatively the mask value is the function of the array entry index modulo the security parameter. Given a pointer to an address in the array, each masked data entry is readily unmasked (the obfuscation is removed) by taking the function of the pointer modulo the security parameter as the unmasking value, and logically combining that unmasking value with the masked array entry. The larger the security parameter, the greater the security.

The second method obfuscates the addresses of data entries of a data array, where the array in the logical memory is shuffled in terms of the order of its entries relative to that array in the corresponding physical memory, and further the order of the entries in each block is shuffled in a predetermined fashion. This shuffling is used to decouple the physical address (the actual location in memory where the data is stored) from the logical address (i.e., the index of the array). The result is that contrary to usual practice the first word of the obfuscated table will not be stored in the corresponding first word of the physical memory and so on. Note that computer software almost always operates in terms of logical memory addresses. This method further advantageously is compatible with incrementing address pointers.

DETAILED DESCRIPTION

Therefore a well known technical problem is how to obfuscate the data in arrays of the type manipulated by computer software. One issue is that such data arrays can be manipulated as pointers (physical addresses), i.e. the software compiler may not know the primary address (the physical address of the first word or entry of the array) in memory of the array, which is designated here tab. As explained above, logical addresses do not exist in physical memory. They correspond to what is written in the source code. E.g., a table designated tab[0] has a logical address of 0, a primary address of tab but it can be stored in a physical memory array designated Array at a physical address of A.

The array entries, each having an index i of the array tab, are each designated here tab[i]). The software compiler may also not know the array entry's index i corresponding to the pointer which is designated ptr, so that by definition ptr=&tab[i]) where "&" indicates "the address of". The compiler only knows that the pointer ptr points to some memory location in the array tab. This algebraic notation is used here for purposes of understanding and is not limiting, but is convenient because it corresponds to a software implementation of embodiments of the invention, as explained further below.

Known solutions for data array obfuscation include that of US Patent Application Publication No. 2009/0307657, now issued as U.S. Pat. No. 8,434,061 to Farrugia et al., published Dec. 10, 2009 "System and Method for Array Obfuscation." assigned to Apple Inc. and incorporated herein by reference in its entirety. This discloses dividing an array into a plurality of secondary arrays and expanding each of the secondary arrays and arranging the data elements in each of the expanded arrays. This approach has some disadvantages, notably the large size of the array containing all the addresses of the resulting memory misallocations/allocations, as well as the speed of accessing the table to recover the primary addresses.

The present disclosure provides two processes useful in the field of obfuscation: first, how to obfuscate data in an array, and second, how to shuffle (i.e., obfuscate) addresses of entries in an array.

Obfuscating Data

First consider an array as explained above such as a table tab defined and used in a computer program (also referred to as software or code), written in any suitable computer language. In obfuscation, one requirement is masking (obscuring) the data which is the content of the array.

The present method introduces a security parameter (typically an integer number) designated here t, for example t=16. Then, any table tab allocated by the compiler or software system when the source code version of the software is compiled into its object code version will have a primary address equal to 0%t where "%" means the modulo operation. More broadly, the primary address modulo t equals a constant which is determined at code compilation time.

This particularly implies a change in the way memory allocations are performed by the compiler, so that any pointer value ptr (including such a pointer to a table) returned by the compiler is such that ptr=0%t for the primary address of any particular array.

This approach will consume (lose) some physical and logical memory. At most there will be a loss of t−1 data words per memory allocation (that is, for each array), assuming each entry tab[i] in the table tab is one data word long.

Then, one can obfuscate the table (or array tab) as follows:

(i) Choose a type of obfuscation (masking, which is a logical or mathematical operation) such as affine, logical, or additive type. This choice can be seen as a choice of a function designated G of two parameters designated x and m. E.g., G(x,m)=x XOR m for the boolean (logical type) masking or G(x,m)=x+m for the affine type masking. For reasons made clearer below, function G is selected to be an invertible function for the affine type masking. I.e., $G^{-1}$(y,m)=x such that G(x,m)=y. E.g., if the masking operation G is XOR m, then $G^{-1}$(y,m)=y XOR m, or if G is the addition operation, then $G^{-1}$(y,m)=y−m.

(ii) Choose a second function f, where function f is preferably an invertible logical or mathematical function. (There is no relation between functions f and G.) f is a function of one parameter, e.g., if f is an arithmetic function then (x)=x*3 or f(x)=x+3.

(iii) Mask the data (in this case a table) by logically or mathematically applying the masking value using the previously defined masking functions f and G, e.g. on a bit-by-bit basis to each table data entry tab[i] to arrive at the obfuscated table entry designated here as tabob[i], so this process is expressed as:

tabob[i]=G(tab[i],f(&tab[i]%t))

E.g., with the Boolean (logical) masking function G being the XOR operation, i.e., G(x,m)=x XOR m, this is expressed as:

tabob[i]=tab[i]XORf(&tab[i]%t)

and where as explained above tab[i] is the clear (unmasked) table entry data for index i. An alternative for step (iii) above is to use a different masking value f( ) which is f(i%t), so as to compute: tabob[i]=tab[i] XOR f(i%t)

Figure 2:
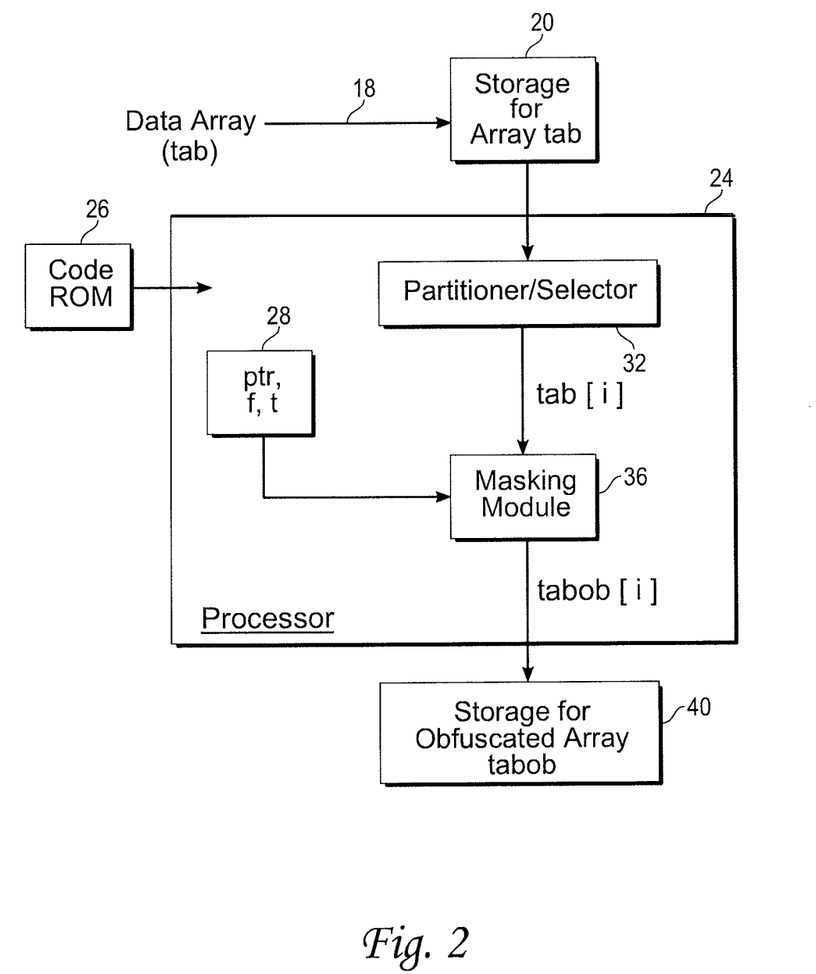
FIG. 2 shows in a block diagram an apparatus and method to obfuscate data.

FIG. 2 illustrates this method in the form of a computer based apparatus 14 conventionally embodied in software executed by a processor. The data array tab is provided at input port 18 to be stored in computer readable memory (storage) 20. The array is then coupled to a processor 24 which executes object code to carry out the method as provided from code memory (here ROM) 26. Processor 24 selects each data entry tab[i] from memory 20 by partitioner/selector software module 32, then provides entry tab[i] to the masking calculator software module 36. Module 36 also receives function f and parameter t and pointer pt from storage 28. The resulting computed masked entry tabob[i] is then stored in output memory 40. This process is repeated for each entry of the entire table.

With this method, whatever the table tab is (in terms of size, memory location etc.,) the first word (entry) tab[0] of the table is masked with masking value f(&tab[0])=f(0), the second word tab[1] with masking value f(1), f(&tab[i])=, . . . , the t-th word tab[i−1] with masking value f(t−1), the t+1-th word tab[i] with masking value f(0) and so on.

Thus given an address pointer ptr to a particular memory location, one can later unmask (recover) the table entry tabob[i] stored at that address, without knowing either the primary (beginning) address of the table or the index i to which that entry corresponds, since the unmasking value for entry tabob[i] is simply computed as f(ptr%t). So the complementary unmasking computation to recover the clear version of the data of table entry tab[i] is:

tab[i]=$G^{-1}$(tabob[i],f(ptr%t)), e.g., for the example of the logical XOR masking operation:

tab[i]=tabob[i]XORf(ptr%t)

This process would be carried out by an apparatus similar to that of FIG. 2.

The parameter t is chosen so that the larger t is, the more security provided, because there are more possible mask values. Exemplary values of t are 16 and 32. But at the same time, the larger t, the more physical memory is necessary to represent the tables (due to the greater amount of unused physical memory locations as explained above). This is because of the imposed condition (explained above) that for instance all primary address pointers returned are equal to 0%t, or in the general case, equal to a constant.

This condition may appear not to be necessary, since the masking value could simply be f(ptr%t). In fact, such a condition is essential, since the compiler needs to know at software compilation time the values of the masking values, even if it doesn't know the corresponding real (physical) address in memory precisely. If this condition were not imposed on the obfuscated table address, the compiler would not be able to know the associated masking values at software compilation time.

Another issue is that every table (or array) masked by this process will have the same set of masking values (i.e., from f(0) to f(t−1), and always in the same order). This degrades security. The following describes several (alternative) solutions to overcome this weakness.

A first solution to this weakness is to use this masking method in combination with other masking techniques; more broadly, this method can be used with virtually any other known obfuscation technique. This particularly implies that the function f can be of any type and can itself include another type of masking operation which may change from table to table.

A second solution is to add entropy (randomness or unpredictability or diversification) in the way the masking values are determined, for instance by one of the following steps:
(i) make the value t dependent on the first bits of the value of the primary address ptr. This means, in effect, the value t depends on the page number of memory which the pointer points to since typically computer memory addresses are a concatenation of a page, a row, and a column. One allocates large arrays in a first area of the memory, with a large value t, and small arrays in a second area of the memory, with a smaller value of t. Thus the amount of "lost" memory is smaller, but the value t advantageously is diversified. In the unmasking process, the value t is recovered from the masked pointer ptr itself, by accessing the corresponding bits of ptr, knowing the construction of ptr. A sufficient condition is that the corresponding bits of all addresses ptr+i are equal, which is feasible for reasonably small arrays, and no array or table allocation is over two "pages" of addresses.
(ii) based on same idea of pointer-value dependency, make function f dependent on some predetermined bits of pointer ptr.

To simplify the above example uses the example of only two such memory areas but this is not limiting. These techniques (i) and (ii) are relatively efficient since they only impose on the obfuscation process a software macro which determines if the array is to be stored in one of the two memory areas (for respectively the smaller t and larger t). Then, the compiler would know at the code compilation time which parameter t and function f correspond to the array currently being obfuscated, and where in memory that array has to be allocated. This also must be forced in the memory allocation process by adapting or reprogramming this part of the relevant computing device's operating system.

The main advantage of this obfuscation method is that it is relatively "light" in software terminology meaning that it does not substantially reduce processing speed or require a large array of all the allocated pointers. It does impose, as explained above, certain changes on the memory allocation process during code compilation, but once that is done, the actual masking is relatively simple to compute. The disadvantages are (1) the "lost" (unused) memory, but this lost memory may be used for other purposes such as to store some non-transformed arrays, and (2) the lack of diversification in the masking as explained above, if t is too small, or if the (t,f) ptr-dependency is too low. As also explained above, this second disadvantage can be eliminated by using other masking techniques in addition, or with sufficient (t,f) pointer-dependency.

Obfuscating Addresses by Shuffling

This portion of this disclosure describes the second obfuscation method which obfuscates by creating a difference between logical and physical addresses of an array, i.e. by shuffling addresses of data arrays such as tables so as to obscure the logical addresses. Note that conventionally in software code conventionally there is "logical memory", i.e. access to the array as if it was a mathematical object. In the obfuscated program and memory, there is a physical address. The shuffling makes these two views (logical and physical) decoupled, e.g., so the i-th word of the logical array is not stored in the i-th word of the physical memory.

Let s be an integer which designates a security parameter, e.g. s=16 or 32 as above. One wants to allocate memory for a table designated T of size (number of entries) designated n. The goal is to change the logical memory allocation process, so that: (1) a returned pointer for table T is a pointer ptr, so that for the primary address of table T, ptr=0%s (similar to the above description for data masking); (2) the allocated address is not size n, but size n' which is the multiple of s larger or equal to size n. In other words, one allocates size n'=n+(−n%s).

Figure 3:
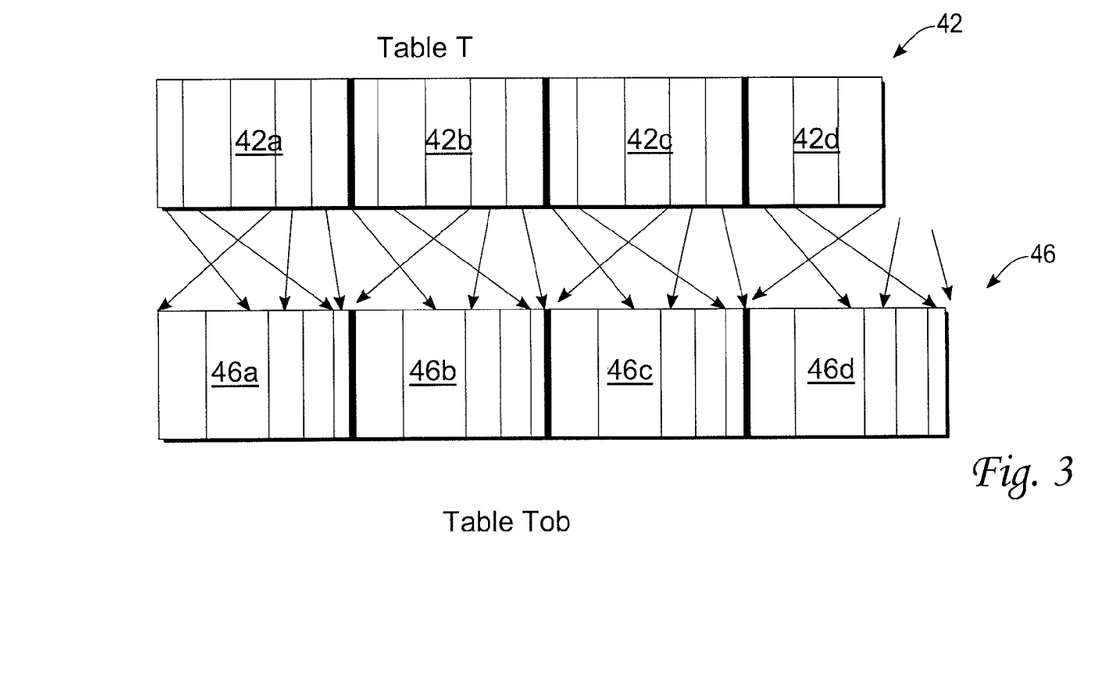
FIG. 3 shows how to shuffle addresses.

Then one shuffles table T which is first conventionally partitioned into blocks of size s meaning that each block includes s data words or table entries. This is shown diagrammatically in FIG. 3 where the upper table 42 is the "clear" (non-obfuscated) table T which is the logical array having blocks 42a, . . . , 42d, and the lower table 46 is the address-obfuscated table Tob in the corresponding physical memory having blocks 46a, . . . , 46d. The clear (upper) table is of size (length) n in terms of the number of entries, where n has no reason to be a multiple of s. But the obfuscated table size n' is a multiple of s by construction. Moreover each block in table T at 42 has its entries shuffled in the same way (order), as shown in FIG. 3 by the arrows. Note there is no shuffling in this example of the order of the set of blocks themselves. For the shuffling in each block of size s, one defines an invertible shuffling function go from [0, . . . , s−1] to [0, . . . , s−1]. Function g thereby sets a predetermined order (algorithm) for the shuffled entries as shown in FIG. 3.

Then, for all $0<=i<s$, each entry T[i] is stored in the obfuscated table 46 designated Tob[ ] at a memory location Tob[ ], computed as:

$$Tob[i]=T[i-(i\%s)+g(i\%s)].$$

Figure 4:
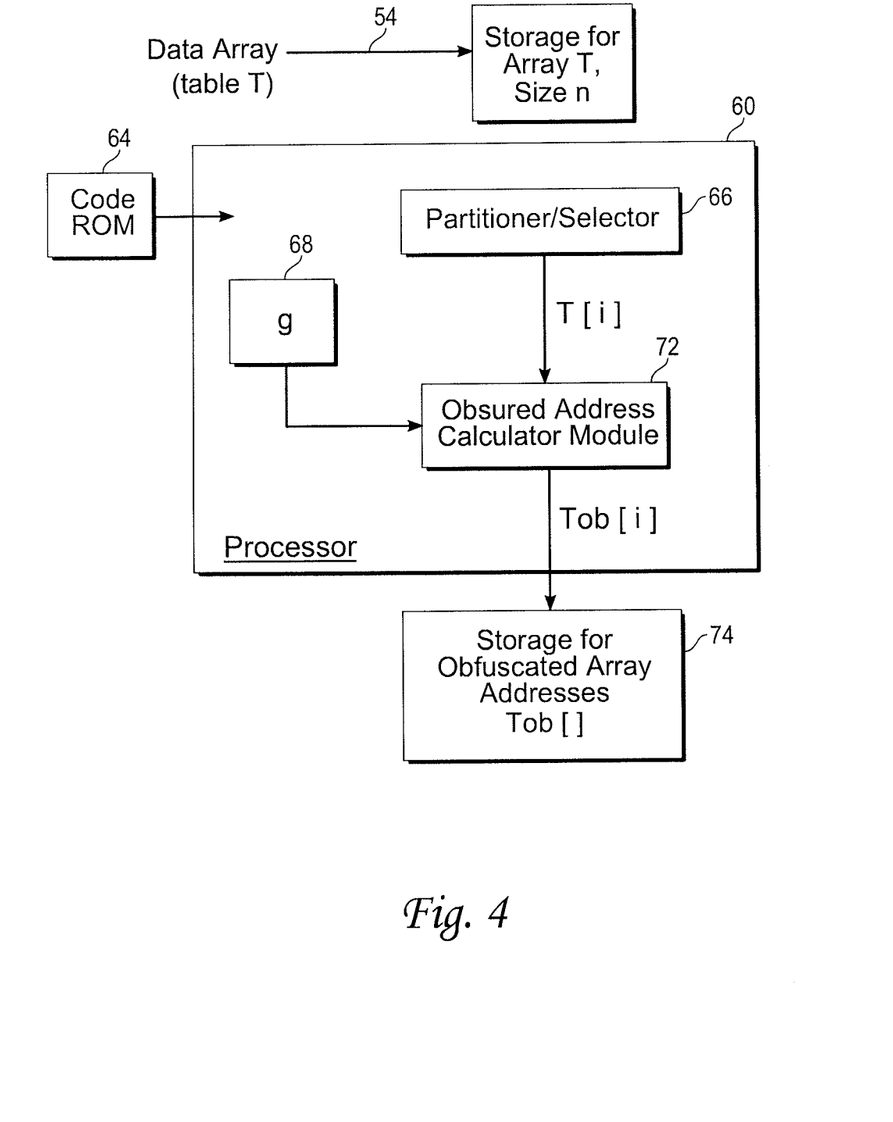
FIG. 4 shows an apparatus and method to carry out the process of FIG. 3.

FIG. 4 illustrates the corresponding apparatus 50, where the clear (non-shuffle) table T is provided at input port 54 and stored in memory 56, table T having size n. Then processor 60, coupled to memory 56, selects each data entry T[i] at partitioner (selector), software module 60, by executing code supplied from ROM code memory 64. Values s and g are also stored in memory 68, and coupled to the address calculator software module 72, which calculates the masked memory locator Tob[ ]. This is then stored in output memory 74.

To understand this process, i−(i%s) simply corresponds to the start address of the block corresponding to the i-th position in table Tob, and g(i%s) is the shuffling function (algorithm) indicated in FIG. 3 by the arrows applied to each block.

Note that in the obscured table Tob[ ] 46 as shown in FIG. 3, some entries in the final block 46d (or blocks) actually do not correspond to any values in clear table T[ ] 42, since n is not a multiple of s. Preferably these otherwise unused memory locations are filled with random or checksum values as a type of padding. When shuffled, these unused extra blocks are located in the last "shuffled" block 46d.

To use (recover) the obfuscated blocks, these are two possibilities: either one knows that the goal is to access logical value T[i] which is physically stored in location Tob[i−(i%s)+g(i%s)], or one is working with arithmetic pointers, such as in some loops. The present approach is especially useful in this second case, as it particularly fits, indeed, one is able to increment pointers by directly computing on physical address (obfuscated) pointers, while in most current solutions (if not all), one needs to operate on the logical address, which is less secure and time consuming. Note that often there is no need to recover the original address, but one can directly apply pointer arithmetic on the physical (obfuscated) pointers. Otherwise, one can recover the clear version of the obfuscated address by using the inverse of the shuffling function.

Note that this method is compatible with familiar software operations such as ptr++. (This notation means increment ptr by one.)

Indeed, if just a pointer ptr to the obfuscated table is available, computing ptr++ is simply done as follows:

$$ptr=ptr+X[ptr\%s]$$

where X[ ] is a constant table constructed at the code compilation time with g( ) and s. Note that X[ ] is a table of signed values. This table is constructed as follows:

For all indices designated u in the range [0, . . . , s−1], do:
X[u]: let $v=g^{-1}(u)$ where as above "$^{-1}$" indicates the inverse so this recovers the index designated v that was sent to index u by the obfuscation
if (v+1<s) which is the normal case
let w=g(v+1)
return X[u]=w−u
if (v+1==s) actually, one needs to pass to the next s-word group
let w=g(0)+s
return X[u]=w−u For pointer increments of greater than 1, one can either compute tables X[ ] for different increments, or can do several increments by 1. Each table X[ ] is s entries long, so if value s is not too large, one could provide many X[ ] tables.

This shuffling method is easy to calculate and compatible with increments of pointers. The shuffling is not perfect, since it is only done inside each block. Furthermore, as explained, all tables are shuffled in the same way. However, one can use this method as above in combination with using a few bits of the value ptr to diversify selection of the function g( ) as well as value s, as explained above for the data obfuscation.

Also, the above two obfuscation methods (for data and addresses) can advantageously be used together, notably if t=s or if t or s is a multiple of the other.

In addition to the computer enabled (software) obfuscation/deobfuscation processes disclosed here, also contemplated is (alternatively) a hardware (logic circuitry) apparatus dedicated to performing these processes as illustrated above, a computer readable storage medium such as a computer memory, disc drive, or CD storing computer code (a program) for carrying out the processes on a general purpose computer or computing device, and a computer or computing device programmed with this computer code as described above. Typical languages for software coding of the processes are the well known C and C++ languages. Writing such code would be routine in light of the above algebraic descriptions of embodiments of the invention.

Figure 5:
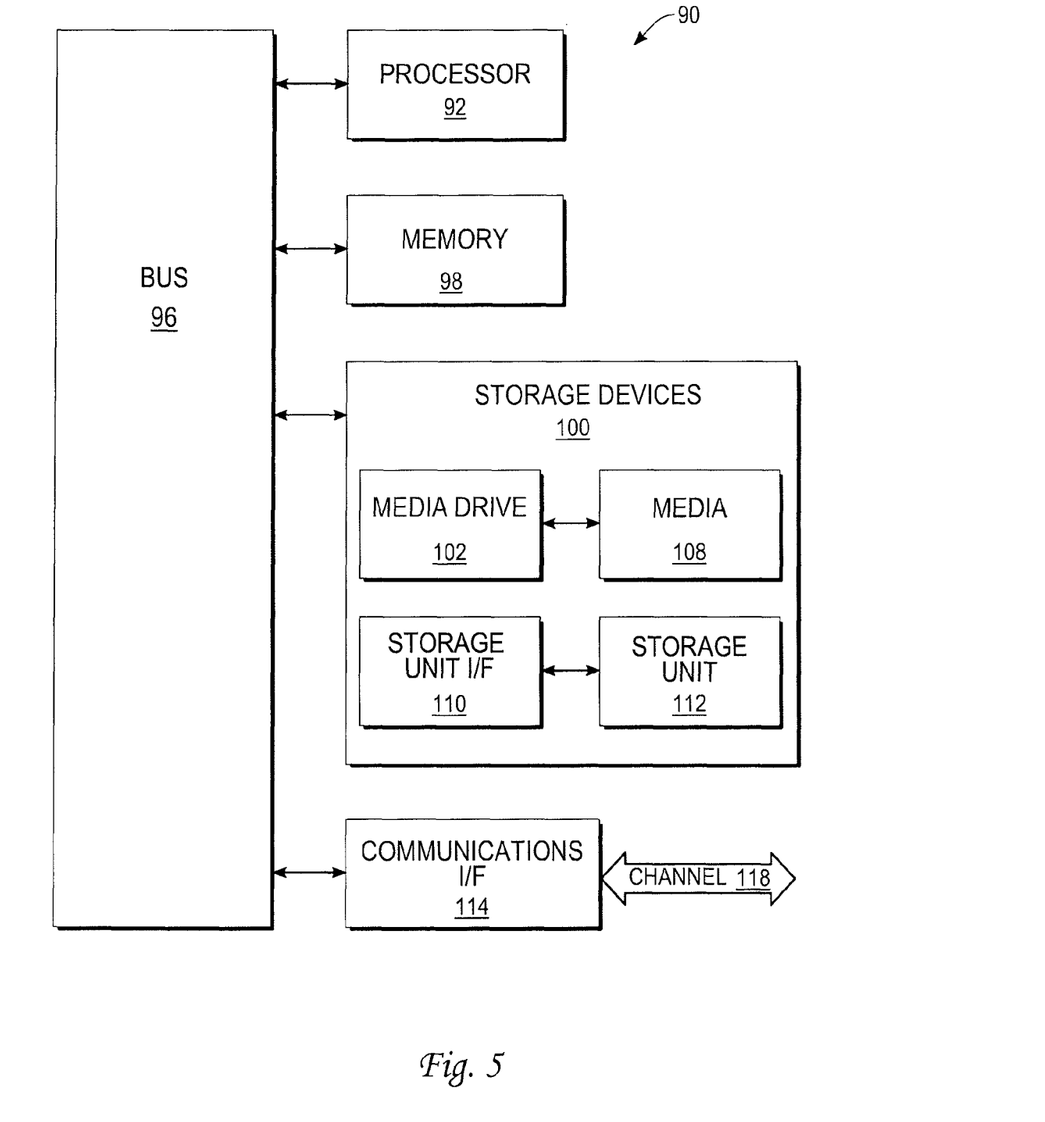
FIG. 5 shows conventional detail of a computing apparatus of FIGS. 2 and 4.

FIG. 5 shows in a block diagram relevant portions of a computing device (system) 90 which is suitable to carry out obfuscation and/or deobfuscation or both in accordance with the invention. (Commonly both obfuscation and deobfuscation are carried out in the same device.) This is, e.g., a server platform, computer, mobile telephone, Smart Phone, personal digital assistant or similar device, or part of such a device and includes conventional hardware components executing in one embodiment software (computer code) as represented by the above pseudo-code example. This code may be, e.g., in the C or C++ computer language or its functionality may be expressed in the form of firmware or hardware logic; writing such code or designing such logic would be routine in light of the above description. Of course, the above examples are not limiting. Electric signals conventionally are carried between the various elements of FIG. 5.

FIG. 5 thus shows further detail of the FIGS. 2 and 4 computing devices in one embodiment. FIG. 5 illustrates a typical and conventional computing system 90 that may be employed to implement processing functionality in embodiments of the invention for encrypting and/or decrypting and shows additional detail of the FIGS. 2 and 4 systems. Computing systems of this type may be used in a computer server or user (client) computer or other computing device, for example. Those skilled in the relevant art will also recognize how to implement embodiments of the invention using other computer systems or architectures. Computing system 90 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system can include one or more processors, such as a processor 92 (equivalent to processors 4 and 60 in FIGS. 2 and 4). Processor 92 can be implemented using a general or special purpose processing engine such as, for example, a microprocessor, microcontroller or other control logic. In this example, processor 92 is connected to a bus 96 or other communications medium. Note that in some embodiments the present process is carried out in whole or in part by "hardware" (dedicated circuitry) which is equivalent to the above described software embodiments.

Computing system 90 can also include a main memory 98 such as random access memory (RAM) or other dynamic memory, for storing information and instructions to be executed by processor 92. Main memory 98 also may be used for storing temporary variables or other intermediate information during execution of instructions to be executed by processor 92. Computing system 90 may likewise include a read only memory (ROM) or other static storage device coupled to bus 96 for storing static information and instructions for processor 92.

Computing system 90 may also include information storage system 100, which may include, for example, a media drive 102 and a removable storage interface 110. The media drive 102 may include a drive or other mechanism to support fixed or removable storage media 108, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 108 may include, for example, a hard disk, floppy disk, magnetic tape, optical disk, CD or DVD, or other fixed or removable medium that is read by and written to by media drive 102. As these examples illustrate, the storage media 108 may include a computer-readable storage medium having stored therein particular computer software or data.

In alternative embodiments, information storage system 100 may include other similar components for allowing computer programs or other instructions or data to be loaded into computing system 90. Such components may include, for example, a removable storage unit 112 and an interface 110, such as a program cartridge and cartridge interface, a removable memory (for example, a flash memory or other removable memory module) and memory slot, and other removable storage units 112 and interfaces 110 that allow software and data to be transferred from the removable storage unit 112 to computing system 90.

Computing system 90 can also include a communications interface 1144 (equivalent to ports 18 and 54 in FIGS. 2 and 4). Communications interface 114 can be used to allow software and data to be transferred between computing system 90 and external devices. Examples of communications interface 84 can include a modem, a network interface (such as an Ethernet or other network interface card (NIC)), a communications port (such as for example, a USB port), a PCMCIA slot and card, etc. Software and data transferred via communications interface 114 are in the form of signals which can be electronic, electromagnetic, optical or other signals capable of being received by communications interface 114. These signals are provided to communications interface 84 via a channel 118. This channel 118 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 98, storage device 118, or storage unit 112. These and other forms of computer-readable media may store one or more instructions for use by processor 92, to cause the processor to perform specified operations. Such instructions, generally referred to as "computer program code" (which may be grouped in the form of computer programs or other groupings), when executed, enable the computing system 90 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 90 using, for example, removable storage drive 112, drive 102 or communications interface 114. The control logic (in this example, software instructions or computer program code), when executed by the processor 92, causes the processor 92 to perform the functions of embodiments of the invention as described herein.

This disclosure is illustrative and not limiting. Further modifications and improvements will be apparent to these skilled in the art in light of this disclosure and are intended to fall within the scope of the appended claims.

The invention claimed is:

1. A method of obfuscating an array of data implemented by a machine comprising at least one processing unit and a machine readable storage, the method comprising:
   computing a security parameter that is a function of a page number of a primary memory address of the array, wherein the primary address is a physical address of the first entry of the array;
   computing a masking value by using a first function that takes as an input one of (i) an address of a selected entry from a plurality of entries of the array modulo the computed security parameter and (ii) an index of the selected entry modulo the computed security parameter;
   computing an obfuscated value for the selected entry of the array by using an invertible second function that takes as input the computed masking value and a value of the selected entry of the array, wherein the computation of the security parameter, the masking value, and the obfuscated value are performed by the machine; and
   storing the obfuscated value of the selected entry in the machine readable storage.

2. The method of claim 1 further comprising repeating, for each of the remaining entries of the array, the computing of an obfuscated value and the storing of the obfuscated value in the machine readable storage.

3. The method of claim 1, wherein the invertible second function is one of an affine, logical, and arithmetic function, wherein the first function is respectively affine, logical, or arithmetic.

4. The method of claim 1, wherein the first function is invertible.

5. The method of claim 1, wherein the primary address of the array modulo the security parameter equals a predetermined constant value.

6. The method of claim 1, wherein the first function is determined by the address of the selected entry of the array.

7. An apparatus for obfuscating an array of data, comprising:
- a set of processing units; and
- a non-transitory machine readable storage storing a program for execution by at least one processing unit, the program comprising sets of instructions for:
  - computing a security parameter that is a function of a page number of a primary memory address of the array, wherein the primary address is a physical address of the first entry of the array;
  - computing a masking value by using a first function that takes as an input one of (i) an address of a selected entry from a plurality of entries of the array modulo the computed security parameter and (ii) an index of the selected entry modulo the computed security parameter;
  - computing an obfuscated value for the selected entry of the array by using an invertible second function that takes as input the computed masking value and a value of the selected entry of the array; and
  - storing the obfuscated value of the selected entry.

8. The apparatus of claim 7, wherein the program further comprises sets of instructions for:
- computing an obfuscated value for each of the remaining entries of the array with a different computed masking value; and
- storing the obfuscated value for each of the remaining entries.

9. The apparatus of claim 7, wherein the invertible second function is one of an affine, logical, and arithmetic function, wherein the first function is respectively affine, logical, or arithmetic.

10. The apparatus of claim 7, wherein the first function is invertible.

11. The apparatus of claim 7, wherein the primary address of the array modulo the security parameter equals a predetermined constant value.

12. The apparatus of claim 7, wherein the first function is determined by the address of the selected entry of the array.

13. A non-transitory machine readable storage medium storing a program for execution by at least one processing unit, the program comprising sets of instructions for:
- computing a security parameter that is a function of a page number of a primary memory address of an array, wherein the primary address is a physical address of the first entry of the array;
- computing a masking value by using a first function that takes as an input one of (i) an address of a selected entry from a plurality of entries of the array modulo the computed security parameter and (ii) an index of the selected entry modulo the computed security parameter;
- computing an obfuscated value for the selected entry of the array by using an invertible second function that takes as input the computed masking value and a value of the selected entry of the array; and
- storing the obfuscated value of the selected entry.

14. The non-transitory machine readable storage medium of claim 13 further comprising sets of instructions for:
- computing an obfuscated value for each of the remaining entries of the array with a different computed masking value; and
- storing the obfuscated value for each of the remaining entries.

15. The non-transitory machine readable storage medium of claim 13, wherein the invertible second function is one of an affine, logical, and arithmetic function, wherein the first function is respectively affine, logical, or arithmetic.

16. The non-transitory machine readable storage medium of claim 13, wherein the first function is invertible.

17. The non-transitory machine readable storage medium of claim 13, wherein the primary address of the array modulo the security parameter equals a predetermined constant value.

18. The non-transitory machine readable storage medium of claim 13, wherein the first function is determined by the address of the selected entry of the array.

* * * * *